United States Patent [19]

Eng

[11] Patent Number: 5,072,171

[45] Date of Patent: Dec. 10, 1991

[54] HIGH EFFICIENCY POWER CONVERTER EMPLOYING A SYNCHRONIZED SWITCHING SYSTEM

[75] Inventor: John E. Eng, Buena Park, Calif.

[73] Assignee: Hughes Aircraft Company, Los Angeles, Calif.

[21] Appl. No.: 468,514

[22] Filed: Jan. 23, 1990

[51] Int. Cl.[5] .......................................... H02M 3/157
[52] U.S. Cl. .................................... 323/283; 323/286; 323/288
[58] Field of Search ............... 323/283, 285, 286, 287, 323/288, 290, 351

[56] References Cited

U.S. PATENT DOCUMENTS 3,621,372  11/1971  Paine .................................... 323/287
4,727,308  2/1988  Huljak et al. ......................... 323/287

FOREIGN PATENT DOCUMENTS 0860034  8/1981  U.S.S.R. ............................... 323/286

Primary Examiner—William H. Beha, Jr.
Assistant Examiner—Nilay H. Vyas
Attorney, Agent, or Firm—Robert A. Westerlund; Steven M. Mitchell; Wanda K. Denson-Low

[57] ABSTRACT

A synchronized switching system for use in a power converter. A pulse-width modulation controller is provided to alternately turn on and off a switching device and control the on/off duty cycle. When the switching device is turned off, initial commutating or flyback current from an inductor is conducted by a protective diode connected to ground. The diode is paralleled by a more efficient secondary switching device that is synchronized to conduct during the nonconduction period of a main switching device. A sense winding is added on the inductor for synchronizing the secondary switching device. A digital logic circuit controls the conduction time of the secondary switching device based on signals from a pulse-width modulation controller and from the sense winding of the inductor. After the main switching device has been conducting for the required time, the pulse-width modulation controller turns it off. The digital logic circuit senses the voltage level on the inductor and causes the secondary switching device to conduct, just after the main switching device stops conducting. The digital logic circuit prevents the main and secondary switching devices from conducting simultaneously.

17 Claims, 2 Drawing Sheets

TIMING DIAGRAM

TRUTH TABLE 1
| A DRIVE | L | SYNC* | OUTPUT |
|---------|---|-------|--------|
| 1 | — | — | 0 |
| — | — | 4 | 0 |
| — | 0 | 1 | 0 | 1 |
Fig. 2c.
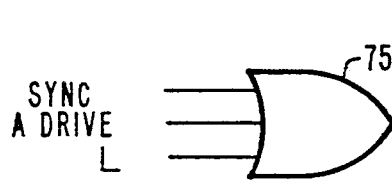
Fig. 3a.
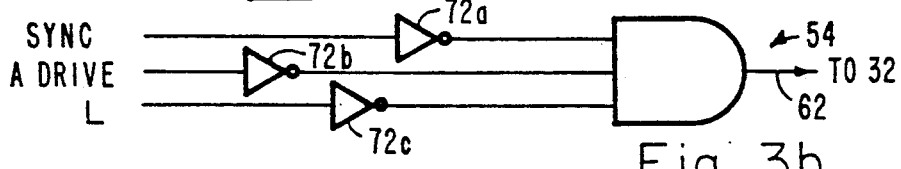
Fig. 3b
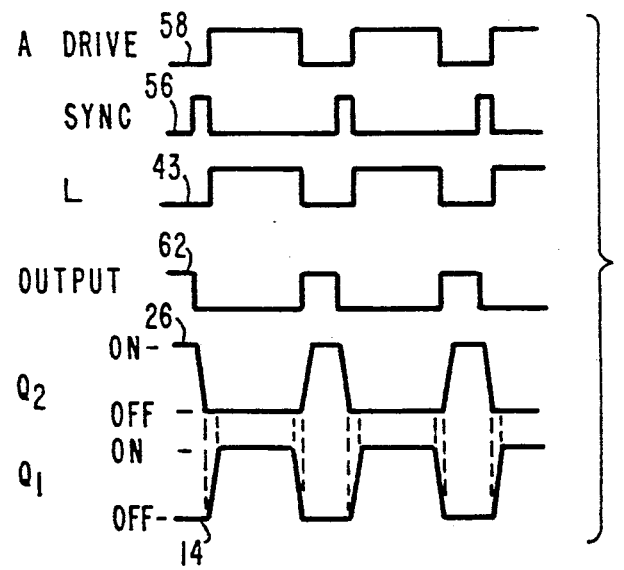
Fig. 3
TRUTH TABLE 2
| A DRIVE | L | SYNC | OUTPUT |
|---------|---|------|--------|
| 1 | — | — | 0 |
| — | — | 1 | 0 |
| 0 | 1 | 0 | 1 |
Fig. 3c.

HIGH EFFICIENCY POWER CONVERTER EMPLOYING A SYNCHRONIZED SWITCHING SYSTEM

BACKGROUND

This invention relates to power supply technology, and more specifically, to an improvement in a power converter.

Solid state power converters are typically used on satellites, for example. Power converters of this kind, working in conjunction with solid state power amplifiers, need to meet aggressive system efficiency specifications. A typical source of input for these amplifiers and converters may be a high voltage bus from solar panels and batteries charged while the solar panels are energized. Since this source is limited, a high efficiency power converter having low losses is essential. In satellite applications, a 3% improvement over previous technology is an advantage.

In conventional power converters, the incoming voltage is pulse-width modulated to provide a predetermined constant voltage level at the output. The pulse-width modulator controller alternately turns on and off a switching device in accordance with the input voltage levels and the desired output voltage levels. By adjusting the duty cycle (Ton vs. Toff), the required output voltage level is attained. When the switching device is turned on, current passing through an inductor to the output creates an electromagnetic force on the inductor. When the switching device is turned off, the electromagnetic field collapses, inducing a flyback current that flows to the output through a commutating diode. The efficiency of this system may be increased by providing a more efficient mechanism than the lossy commutating diode which has a fixed voltage drop (e.g. 0.4 V for a Schottky diode). Synchronous rectifiers have been proposed as an alternative for the commutating diode, but specific synchronization systems that prevent conduction overlap between the switching devices are not available.

It is therefore an objective of this invention to provide a power supply that is very efficient, and that efficiently handles switching flyback or commutating currents. A further objective of this invention is to meet end-to-end efficiency specifications for solid state power amplifiers by increasing efficiency of the power converter. Yet another objective of the present invention is to prevent conduction overlap of switching devices, while controlling switching flyback or commutating current.

SUMMARY OF THE INVENTION

In accordance with the present invention, the main commutating device, which typically is a lossy diode that conducts commutating or flyback current from the inductor in a conventional power converter, is paralleled by a more efficient secondary switching device that is synchronized to conduct during the nonconduction period of the main switching device. The invention utilizes a synchronization pulse that is normally present in the pulse-width modulation controller integrated circuit. The invention adds a sense winding on the inductor for synchronizing the secondary switching device. A digital logic circuit is provided for controlling the conduction time of the secondary switching device based on signals from the pulse-width modulation controller module and from the sense winding of the inductor.

Operationally, once the main switching device has been conducting for the required amount of time, the pulse-width modulation controller turns it off. At almost the same instant, the voltage across the inductor commutates. The digital logic circuit, working in conjunction with the pulse-width modulation controller, senses the voltage level on the inductor and switches the secondary switching device on, causing it to conduct, just after the main switching device is turned off or made nonconductive. The digital logic circuit is connected to the pulse-width modulation controller and to the sense winding of the inductor, in a manner such that the secondary switching device is prevented from conducting simultaneously with the main switching device.

Sync and sync* signals are used to turn the secondary switching device off prior to turning on the main switching device. Since the sync pulse always occurs just before the start of the next switching period, the time when the sync pulse transitions high is used to turn the secondary switching device off. With almost all pulse-width modulation controller integrated circuits, the width of the sync pulse may be adjusted. By adjusting the width of the sync pulse to equal the time required for the secondary switching device to turn off, the secondary switching device can be made to turn off just before the main switching device turns on. The amount of time the secondary switching device is conducting is therefore maximized, thus providing maximum system conduction time.

The present invention provides for the development of a 95% efficient power supply to be used with solid state power amplifiers, thus making it possible for solid state power amplifiers to meet aggressive end-to-end efficiency specifications, by efficient handling of flyback or commutating currents, while preventing simultaneous conduction of the switching devices.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 is a schematic drawing of a synchronization logic circuit which may be employed in the synchronized switching system of FIG. 1;

FIG. 2b is a timing diagram of the waveforms of the logic circuit of FIG. 2a;

FIG. 2c is a truth table for the logic circuit of FIG. 2a;

FIGS. 3a and 3b are schematic drawings of two different embodiments of a synchronization logic circuit that may be employed in the synchronized switching system of FIG. 1;

FIG. 3c is a timing diagram for the synchronization logic circuits of FIG. 3a showing the various waveforms; and FIG. 3d is a truth table for the logic circuits of FIGS. 3a and 3b.

DETAILED DESCRIPTION

Figure 1:
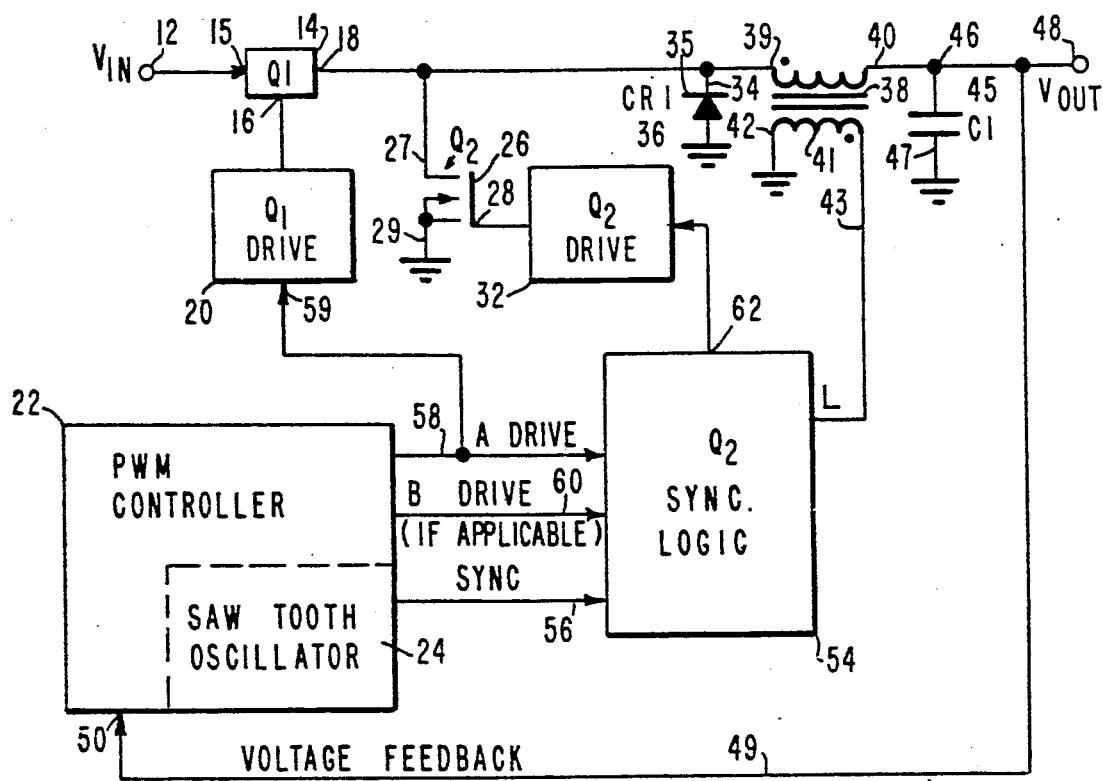
FIG. 1 is a schematic drawing of one embodiment of a high efficiency power converter employing a synchronized switching system in accordance with the principles of the present invention.

Referring now to FIG. 1 of the drawings, there is shown an exemplary embodiment of a high efficiency power converter 10 employing a synchronized switching system. An input power source (not shown) is connected to a high voltage bus 12 having its return connected to ground. The bus 12 is coupled to a main switching device 14 which has two inputs 15, 16 and a single output 18, the first input 15 being coupled to the bus 12, while the second input 16 is used to control the duty cycle of the main switching device 14. The main switching device 14 may comprise a metal oxide semiconductor field effect transistor (MOSFET), for example. The second input 16 is coupled to a pulse-width modulation controller 22, through a device driver 20. The device driver 20 is a commercially available integrated circuit (IC) chip.

The pulse-width modulation (PWM) controller 22 is a commercially available integrated circuit (IC) chip that contains a sawtooth oscillator 24 that is adapted to provide an output synchronization pulse 56. With almost all such PWM controller ICs, the width of the synchronization pulse 56 can be adjusted. In addition to the synchronization pulse 56, the PWM controller 22 is adapted to provide two drive signals, an A drive signal 58 and a B drive signal 60. The A drive signal 58 and B drive signal 60 are adapted to appear alternately to provide a push-pull output. That is, when one drive is on, the other is off. The A drive signal 58 of the controller 22 is coupled to the main switching device 14 through an input 59 of the driver 20, and to a digital logic circuit 54. The A drive signal 58 is adapted to indicate the conduction time of the main switching device 14, to the digital logic circuit 54, and is adapted to control the conduction time of the main switching device 14. The B drive signal 60 is connected to the digital logic circuit 54.

A secondary switching device 26 has first and second inputs 27, 28 and a single output 29, and may comprise a MOSFET, for example. The first input 27 connects to the output 18 of the main switching device 14, the other input 28, which is used for control of the device 26, is coupled to a second device driver 32, which may be identical to the previously mentioned device driver 20. The secondary switching device 26 has its output 29 tied to ground.

A flyback or commutating diode 35 has a cathode 34 coupled to the output 18 of the switching device 14, and an anode 36 that is tied to ground, and may comprise a Schottky diode, for example. The diode 35 is connected in reverse in a power converter 10 of opposite polarity. An inductor 38, which may be on the order of 100 μH, for example, has a terminal 39 coupled to the output 18 of the switching device 14, while another terminal 40 of the inductor 38 is connected to a load 48 having a return tied to ground. The load 48 may be a solid state power amplifier (SSPA), for example.

The inductor 38 has a sense winding 41 that is used for synchronizing the secondary switching device 26. One terminal 42 of the sense winding 41 is tied to ground, while another terminal 43 is coupled to the synchronization digital logic circuit 54. Several different embodiments of the synchronization digital logic circuit 54 are provided and will be discussed hereinafter. A capacitor 45, which may be on the order of 500 μF, for example, has one end 46 coupled to the output terminal 40 of the inductor 38 and has another end 47 tied to ground. A voltage feedback connection 49 connects from the output terminal 40 of the inductor 38, to an input 50 of the PWM controller 22. The input 50 of the PWM controller 22 is used for determining the conduction time of the main switching device 14. The synchronization pulse 56 from the PWM controller 22 is applied to the digital logic circuit 54 from the oscillator 24. The digital logic circuit 54 has an output 62 coupled to the second or control input 28 of the secondary switching device 26 through the second device driver 32.

Figure 2A:
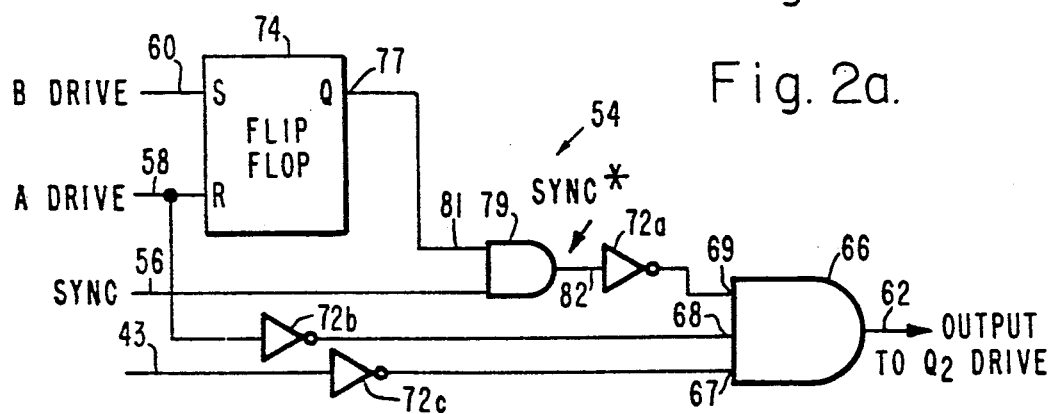

Referring now to FIG. 2a of the drawings, there is shown a schematic drawing of one embodiment of a synchronization digital logic circuit 54. A three input AND gate 66 has each of its inputs 67, 68, 69 coupled to first, second, and third logic inverters 72a, 72b, 72c, the AND gate 66 provides the output 62 of the digital logic circuit 54 to the secondary switching device 26 through the second device driver 32 as described above. The first input 67 of the AND gate 66 is connected to the sense terminal 43 of the sense winding 41 of the inductor 38 through the third logic inverter 72c. The second input 68 of the AND gate 66 is coupled to the A drive 58 of the PWM controller 22 through the second logic inverter 72b. A two input AND gate 79, having a first input coupled to the synchronization pulse 56 of the PWM controller 22 and having a second input 81 coupling to an RS flip-flop 74, has a sync* output 82 coupling to one of the inputs 69 of the three input AND gate 66 through the first logic inverter 72a. The RS flip-flop 74 has two inputs connected to receive the A drive signal 58 and the B drive signal 60 of the PWM controller 22 and a single output 77 coupling to the second input 81 of the two input AND gate 79.

Figure 2B:
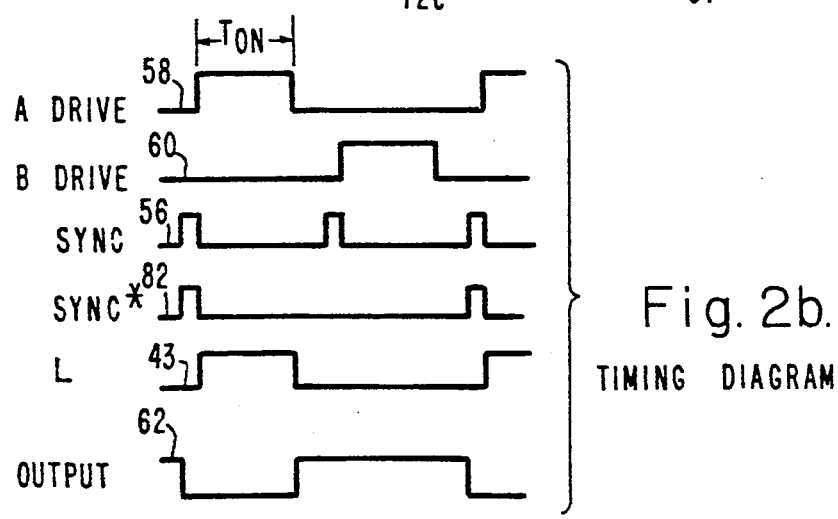

Referring now to FIG. 2b of the drawings, there is shown a timing diagram of the signals controlling the synchronization of the secondary switching device 26 when using a dual output PWM controller 22 of the power converter 10 in FIGS. 1 and 2a. In FIG. 2b, time is along the abscissa and logic levels are along the ordinate, and a high signal represents a logic level 1, while a low signal represents a logic level 0. The first or topmost waveform in FIG. 2b is the A drive signal 58 from the PWM controller 22. The second waveform is the B signal drive 60 signal from the PWM controller 22. The third waveform is the synchronization pulse 56 from the oscillator 24 in the PWM controller 22. The next waveform is the sync* output 82 from the two input AND gate 79. The next to the last waveform L is the sense signal 43 from the sense winding 41 on the inductor 38. The final waveform is the output 62 from the digital logic circuit 54 that is sent to the secondary switching device 26.

In operation, the embodiment of the power converter 10 shown in FIGS. 1 and 2a performs as illustrated by the waveforms in FIG. 2b. The PWM controller 22 turns the main switching device 14 on at the beginning of a switching period by transitioning the A drive signal 58 of the PWM controller 22 high, which causes the output 21 of the device driver 20 to go high, which then turns the main switching device 14 on. When the switching device 14 turns on, current passes from the voltage bus 12 through the switching device 14, and through the inductor 38 to the load 48. The current passing through the inductor 38 creates an electromagnetic field on the inductor 38 causing the voltage on the sense winding 41 of the inductor 38 to go high.

When the PWM controller 22, which senses the load 48 via the voltage feedback connection 49, senses that the switching device 14 has been on the correct length of time, Ton, it transitions the A drive signal 58 of the PWM controller 22 low, which turns the switching device 14 off by way of the device driver 20. When the switching device 14 turns off, the electromagnetic field collapses, inducing a flyback current that passes through the commutating diode 35, and then the voltage level on the inductor 38 reverses polarity or goes to low.

At this time, if the sync pulse 56 or sync* output 82, whichever is applicable, is not high, then the synchronization digital logic circuit 54 turns the secondary switching device 26 on through the second device driver 32. When the switching device 26 turns on, the flyback current passes through the lower loss path comprising the switching device 26, instead of passing through the commutating diode 35 which has a fixed voltage drop of approximately 0.4 volts for a Schottky diode, for example. The main switching device 14 must always turn off before the secondary switching device 26 turns on. The sync pulse 56 and sync* output 82 are used to turn the secondary switching device 26 off prior to the time the main switching device 14 turns on. Since the sync pulse 56 always occurs just before the start of the next switching period, the time when the sync pulse 56 goes high is used to turn the secondary switching device 26 off. With almost all PWM controller IC chips 22, the width of the sync pulse 56 is adjustable. By setting the width of the sync pulse 56 to equal the time required for the secondary switching device 26 to turn off, the secondary switching device 26 is made to turn off just before the main switching device 14 turns on. Therefore, by maximizing the time that the secondary switching device 26 is on and insuring that the main switching device 14 and the secondary switching device 26 are never on simultaneously, the efficiency of the the power converter 10 is maximized.

Referring now to FIG. 2c, there is presented a truth table for the above described embodiment of the digital logic circuit 54, showing how the output logic levels of the A drive signal 58, output of the sense winding 41, and the sync* output 82 from the two input AND gate 79, relate to the logic level at the output 62 of the digital logic circuit 54. Many equivalent logic circuits are possible that implement the logic given in the truth tables. An example of this is that the RS flop flop may be implemented with two cross-strapped with input NOR gates, where one input of each of the two gates is tied to the output of the other gate and the remaining two inputs are the R and S inputs, with one coupled to each of the two gates. Another example is a NOR gate that is equivalent to an AND gate with inverters on each of its inputs.

Referring now to FIGS. 3a and 3b, there are shown schematic drawings of two different embodiments of the synchronization digital logic circuit 54. FIG. 3a shows a three input NOR gate 75 that may be used in the digital logic circuit 54, when using a PWM controller 22. This embodiment does not provide a B drive signal 60 but has the A drive signal 58 and the sync pulse 56. The A drive signal 58, sync pulse 56, and the output of the sense winding output 41, are connected to the NOR gate 75 in any sequence. FIG. 3b shows another configuration of the digital logic circuit 54, in which a three input AND gate 66 with logic inverters 72a, 72b, 72c connected to each of its inputs when using a controller 22 that uses the A drive signal 58 and the sync pulse 56 only. The A drive signal 58, sync pulse 56, and sense winding output 43, are connected to the AND gate 66, through the inverters 72a, 72b, 72c, in any sequence.

Referring now to FIG. 3c, there is shown a timing diagram of the signals controlling the synchronization of the secondary switching device 26 when using a single output PWM controller 22. In FIG. 3c, time is along the abscissa and logic levels are along the ordinate, and a high represents a logic level 1, and a low represents a logic level 0. The first or topmost waveform in FIG. 3c is the A drive signal 58 signal from the PWM controller 22. The second waveform is the sync pulse 56 from the oscillator 24 in the PWM controller 22. The third waveform L is the sense signal 43 from the sense winding 41 on the inductor 38. The fourth waveform is the output 62 of the digital logic circuit 54 that is sent to the secondary switching device 26. The final two waveforms show the timing relationship of the two switching devices 14, 26. The next to last waveform shows the on and off times of the secondary switching device 26 and the final waveform shows the on and off times of the main switching device 14.

Referring now to FIG. 3d of the drawings, a truth table for the embodiments of the digital logic circuit 54 shown in FIGS. 3a and 3b is illustrated, showing how the output logic levels of the A drive signal 58, output of the sense winding 41, and the sync pulse 56, relate to the logic level at the output 62 of the digital logic circuit 54.

Thus there has been described a new and improved power converter employing a synchronized switching system. The synchronized system of the high efficiency power converter provides effective handling of flyback or commutating currents, while preventing conduction overlap of the switching devices. This 96% efficient power converter enabled the development of 30 watt, 95% efficient low voltage (6–8 V) power supplies for SSPAS. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A synchronized switching system for use with a high efficiency power converter, the system comprising:
   a main switching device having two inputs and an output; one of the inputs being adapted to be coupled to a power source and the other input adapted to receive a pulse-width modulation control signal, the output providing a predetermined average voltage level;
   an inductor coupled to the output of the main switching device; the inductor having a sense winding thereon;
   a capacitor connected from the output of the inductor to ground;
   a diode coupled from the output of the main switching device to ground for conducting initial commutating or flyback current from the inductor;
   a pulse-width modulation controller having a plurality of outputs and an input; one of the outputs coupling to the main switching device for providing a pulse-width modulation control signal thereto for controlling the conduction thereof, the remaining outputs being adapted for coupling to digital logic circuitry;

a voltage feedback connection from the output of the inductor to the input of the controller for providing voltage necessary for the controller to sense the voltage level of the output level of the switching system;

a secondary switching device connected in parallel to the diode having two inputs and one output, the secondary switching device having its output tied to ground; and a digital logic circuit coupled to the sense winding of the inductor, to the pulse-width modulation controller, and to one of the two inputs of the secondary switching device; the digital logic circuit being adapted to control the conduction of the secondary switching device;

whereby the secondary switching device provides a low loss path for the commutating or flyback current from the inductor, the secondary switching device being adapted to conduct current during almost the entire time that the main switching device is not conducting, without overlapping the time that the main switching device is conducting so as to enable the switching system to maximize the on time of the secondary switching device.

2. The synchronized switching system of claim 1 in which the switching devices are MOSFETs.

3. The synchronized switching system of claim 1 in which the inductance of the inductor is 100 μH, and the capacitance of the capacitor is 500 μF, and the diode is a Schottky diode.

4. The switching system of claim 1 in which the pulse-width modulation controller contains a saw tooth oscillator for providing a sychronous signal to the digital logic circuit.

5. The switching system of claim 1 in which the digital logic circuit comprises a three input NOR gate.

6. The switching system of claim 1 in which the digital logic circuit is a three input, single output circuit comprising a three input AND gate and three logic inverters; the logic inverters being coupled to each of the AND gates inputs.

7. The switching system of claim 1 in which the digital logic circuit is a four input, single output circuit comprising:

a three input AND gate having each input coupled to a first one of the logic inverters and having one of the inputs coupled to the sense winding of the inductor through a logic inverter;

a RS flip-flop having two inputs coupled to the controller and an output, and having one of the inputs also coupled to the three input AND gate through a second one of the logic inverters and a two input AND gate having one input coupled to the saw tooth oscillator of the controller and the other input connected to the output of the flip-flop, and having the output of the two input AND gate coupled to the three input AND gate through a third one of the logic inverters.

8. In a synchronized switching system for use with a high efficiency power converter, the system containing a main switching device, an inductor, a capacitor, a commutating diode, a pulse-width modulation controller, and a voltage feedback connection, the improvement comprising:

a sense winding on the inductor;

a secondary switching device connected in parallel to the commutating diode and having two inputs and one output, the secondary switching device having one input for receiving an output signal from digital logic circuitry and having its output connected to ground; and a digital logic circuit coupled to the sense winding of the inductor, to the pulse-width modulation controller, and to the input of the secondary switching device and adapted to control the secondary switching device to provide a low loss path for conducting commutating or flyback current from the inductor, and adapted to control the secondary switching device to conduct during almost the entire time that the main switching device is not conducting without simultaneous conduction of the main and secondary switching devices.

9. The synchronized switching system of claim 8 in which the secondary switching device is a MOSFET.

10. The synchronized switching system of claim 8 in which the digital logic circuit comprises a three input NOR gate.

11. The synchronized switching system of claim 8 in which the digital logic circuit comprises a three input AND gate and three logic inverters, and wherein the logic inverters are coupled to each of the AND gates inputs.

12. The synchronized switching system of claim 8 in which the digital logic circuit is a four input and single output circuit comprising:

a three input AND gate with each input coupling to a logic inverter having one of the inputs coupled to the sense winding of the inductor through a first one of the logic inverters;

a flip-flop having two inputs coupling to the controller and having one output and one of the inputs coupled to the three input AND gate through a second one of the logic inverters; and a two input AND gate having one input coupled to the controller and the other input connected to the output of the flip-flop, and having the output of the two input AND gate coupled to the three input AND gate through a third one of the logic inverters.

13. A synchronized switching system for use with a high efficiency power converter, the system comprising:

a main switching device having two inputs and a single output and having one of the inputs adapted to be coupled to a power source and the other input adapted to receive a pulse-width modulation control signal, the output providing a predetermined average voltage level;

an inductor coupled to the output of the main switching device, and having a sense winding;

a capacitor coupled from the output of the inductor to ground;

a diode coupled from the output of the main switching device to ground for conducting commutating or flyback current from the inductor;

a pulse-width modulation controller containing a saw tooth oscillator for providing a synchronization signal output to digital logic circuitry, the controller having a plurality of outputs and an input; one of the outputs coupling to the main switching device for providing a pulse-width modulation control signal thereto for controlling the conduction thereof;

a voltage feedback connection from the output of the inductor to input of the controller for providing voltage necessary for the controller to sense the voltage level of the output level of the switching system;

a secondary switching device connected in parallel to the diode having two inputs and one output and having an input for receiving an output signal from digital logic circuitry and having its output connected to ground;

a digital logic circuit coupled to the sense winding of the inductor, to the pulse-width modulation controller, and to one of the two inputs of the secondary switching device, adapted to control the secondary switching device for providing a low loss path for maximum conduction time without simultaneous operation of the switching devices;

a pair of driver circuits; one of the driver circuits being coupled in series between the controller and the control input of the main switching device, the other driver circuit being coupled in series between the digital logic circuit and the control input of the secondary switching device; and a load coupled between the output of the inductor and ground.

14. The switching system of claim 13 in which the power source is a high voltage bus disposed on a spacecraft.

15. The switching system of claim 13 in which the load comprises a solid state power amplifier.

16. The pulse-width modulation controller of claim 14 in which the width of the synchronization signal provided to the digital logic circuit is adjusted to equal the amount of time the secondary switching device consumes while turning off, thus optimizing conduction time of both switching devices.

17. In a synchronized switching system for use with a high efficiency power converter, the system containing a main switching device, an inductor, a capacitor, a commutating diode, a pulse-width modulation controller, and a voltage feedback connection, the improvement comprising:

a secondary switching device connected in parallel to the diode providing for efficient handling of commutating or flyback currents;

the pulse-width modulation controller providing a sync pulse having a pulse width adjusted to equal the amount of time the secondary switching device consumes when turning off;

a sense winding on the inductor coupled to digital logic circuitry;

a digital logic circuit coupled to the sense winding on the inductor, coupled to receive the sync pulse of the pulse-width modulation controller, and coupled to the input of the secondary switching device, the digital logic circuit providing for a low loss path for commutating or flyback current from the inductor, and the digital logic circuit being adapted to control the secondary switching device to conduct during substantially the entire time that the main switching device is not conducting without simultaneous operation of the main and secondary switching devices.

* * * * *

UNITED STATES PATENT AND TRADEMARK OFFICE
CERTIFICATE OF CORRECTION

PATENT NO. : 5,072,171
DATED : January 30, 1992
INVENTOR(S) : John E. Eng

It is certified that error appears in the above-identified patent and that said Letters Patent is hereby corrected as shown below:

Column 7, Claim 4, line 36, the word "sychronous" is misspelled. It should read --synchronous--.

Column 7, Claim 7, line 49, the sentence "a first one of the logic inverters" should be taken out and placed on line 51 after "inductor through".

Column 9, Claim 13, line 2, insert --the-- after "inductor to".

Signed and Sealed this

Sixth Day of April, 1993

Attest:

STEPHEN G. KUNIN

*Attesting Officer*    Acting Commissioner of Patents and Trademarks